(12) United States Patent
Chen et al.

(10) Patent No.: US 10,642,146 B2
(45) Date of Patent: May 5, 2020

(54) PROJECTION DEVICE

(71) Applicant: Coretronic Corporation, Hsin-Chu (TW)

(72) Inventors: S-Wei Chen, Hsin-Chu (TW); Po-Yu Chiu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/271,888

(22) Filed: Feb. 11, 2019

(65) Prior Publication Data

US 2019/0250499 A1 Aug. 15, 2019

(30) Foreign Application Priority Data

Feb. 14, 2018 (CN) .......................... 2018 1 0151181

(51) Int. Cl.
*G03B 21/20* (2006.01)
*G03B 33/12* (2006.01)
(Continued)

(52) U.S. Cl.
CPC .......... *G03B 33/12* (2013.01); *G02B 27/141* (2013.01); *G03B 21/005* (2013.01);
(Continued)

(58) Field of Classification Search
CPC .. G03B 21/005; G03B 21/006; G03B 21/008; G03B 21/28; G03B 21/208;
(Continued)

(56) References Cited

U.S. PATENT DOCUMENTS 9,664,989 B2 5/2017 Bommerbach et al.
2005/0162614 A1 7/2005 Li et al.
(Continued)

FOREIGN PATENT DOCUMENTS

CN 105022212 11/2015
CN 106371272 2/2017
(Continued)

OTHER PUBLICATIONS

"Search Report of Europe Counterpart Application", dated Jun. 19, 2019, p. 1-p. 6.

*Primary Examiner* — Sultan Chowdhury
(74) *Attorney, Agent, or Firm* — JCIPRNET (57) ABSTRACT

A projection device includes an illumination system, a light splitting and combining element, at least two light valves and an image-forming lens. An illumination beam from the illumination system includes a first color light and a second color light. The light splitting and combining element allows the first color light to pass through and reflects the second color light. The two light valves are respectively disposed on transmission paths of the first and the second color light from the light splitting and combining element, and respectively convert the first color light and the second color light into a first and a second color image light. The image-forming lens receives the first and the second color image light to generate a projection beam, wherein the first color image light passes through and the second color image light is reflected by the light splitting and combining element to the image-forming lens.

13 Claims, 7 Drawing Sheets

(51) Int. Cl.
  *G02B 27/14* (2006.01)
  *G03B 21/00* (2006.01)
(52) U.S. Cl.
  CPC ....... *G03B 21/208* (2013.01); *G03B 21/2033* (2013.01); *G03B 21/2066* (2013.01)
(58) Field of Classification Search
  CPC ............ G03B 21/2013; G03B 21/2033; G03B 21/2053; G03B 21/2066
  See application file for complete search history.

(56) References Cited

U.S. PATENT DOCUMENTS

| | | | |
|---|---|---|---|
| 2006/0256289 A1 | 11/2006 | Fukuzaki et al. | |
| 2011/0096298 A1* | 4/2011 | Huang | G03B 33/12 353/33 |
| 2013/0135592 A1* | 5/2013 | Okuda | F21V 13/00 353/31 |
| 2013/0286357 A1* | 10/2013 | Kodama | G03B 33/12 353/20 |
| 2014/0055754 A1* | 2/2014 | Chuang | G03B 21/005 353/20 |
| 2017/0010524 A1* | 1/2017 | Ishikawa | G03B 21/008 |
| 2018/0080630 A1* | 3/2018 | Wang | F21V 9/30 |
| 2018/0173087 A1* | 6/2018 | Hsieh | G03B 21/2033 |

FOREIGN PATENT DOCUMENTS

| | | |
|---|---|---|
| CN | 107065410 | 8/2017 |
| CN | 207851427 | 9/2018 |
| CN | 207937747 | 10/2018 |

\* cited by examiner

PROJECTION DEVICE

CROSS-REFERENCE TO RELATED APPLICATION

This application claims the priority benefit of China application serial no. 201810151181.6, filed on Feb. 14, 2018. The entirety of the above-mentioned patent application is hereby incorporated by reference herein and made a part of this specification.

BACKGROUND OF THE DISCLOSURE

Field of the Disclosure

The disclosure is related to a projection device, and particularly to an illumination system and a projection device with simple structure.

Description of Related Art

Typically, the structure of a projection device, such as a laser projector, is provided with at least two dichroic mirrors having opposite coating conditions to arrange the optical path for different color light. However, the dichroic mirrors with opposite coating conditions cause the beam of projection device to consume more energy in the transmission process. Besides, there are limits to reduction of the volume of such structure, the manufacturing process of the mechanical element is complex and the required accuracy is higher. In view of the above, it is an issue for practitioners in the field of projection device to figure out how to solve the above problems.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY OF THE DISCLOSURE

An embodiment of the disclosure provides a projection device having the advantage of simple structure, which can reduce the volume of structure while reducing power consumption of the projection device, thereby improving compactness and optical efficiency of the projection device.

The objectives and advantages of the disclosure may be further understood in the technical features disclosed in the disclosure.

To achieve one or a part or all the objectives or other objectives, an embodiment of the disclosure provides a projection device including an illumination system, a light splitting and combining element, at least two light valves and an image-forming lens. The illumination system is configured to provide an illumination beam. The illumination beam includes a first color light and a second color light. The light splitting and combining element is disposed on a transmission path of the illumination beam to allow the first color light to pass through and reflect the second color light. The at least two light valves are respectively disposed on a transmission path of the first color light and the second color light from the light splitting and combining element to respectively convert the first color light and the second color light into a first color image light and a second color image light. The image-forming lens is disposed on a transmission path of the first color image light and the second color image light from the at least two light valves, and receives the first color image light and the second color image light to generate a projection beam, wherein the first color image light from the first color light passes through the light splitting and combining element to the image-forming lens, and the second color image light from the second beam is reflected by the light splitting and combining element to the image-forming lens.

According to the above, in the embodiments of the disclosure, the number of light splitting and combining element required by the projection device may be reduced, such that it is possible to use only the structure of a single light splitting and combining element and thus achieving simple structure. In this manner, the mechanical element can be easily designed and assembled while the volume of projection device can be minimized. Additionally, it is not required to use different coatings and thus the power consumption of the projection device can be reduced, thereby improving compactness and optical efficiency of the projection device and reducing manufacturing cost.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
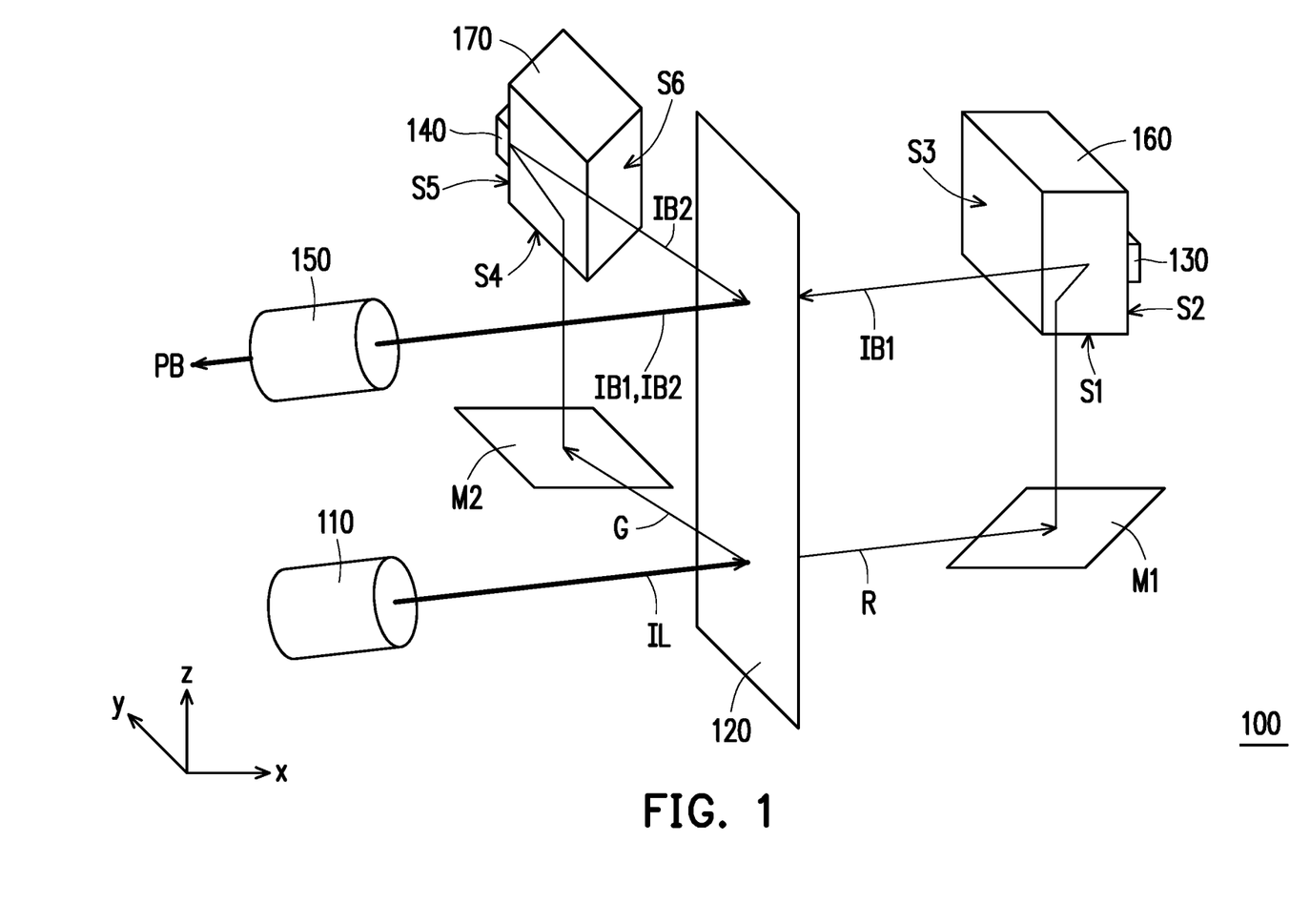
FIG. 1 is a schematic view of a projection device from a perspective according to an embodiment of the disclosure.
Figure 2:
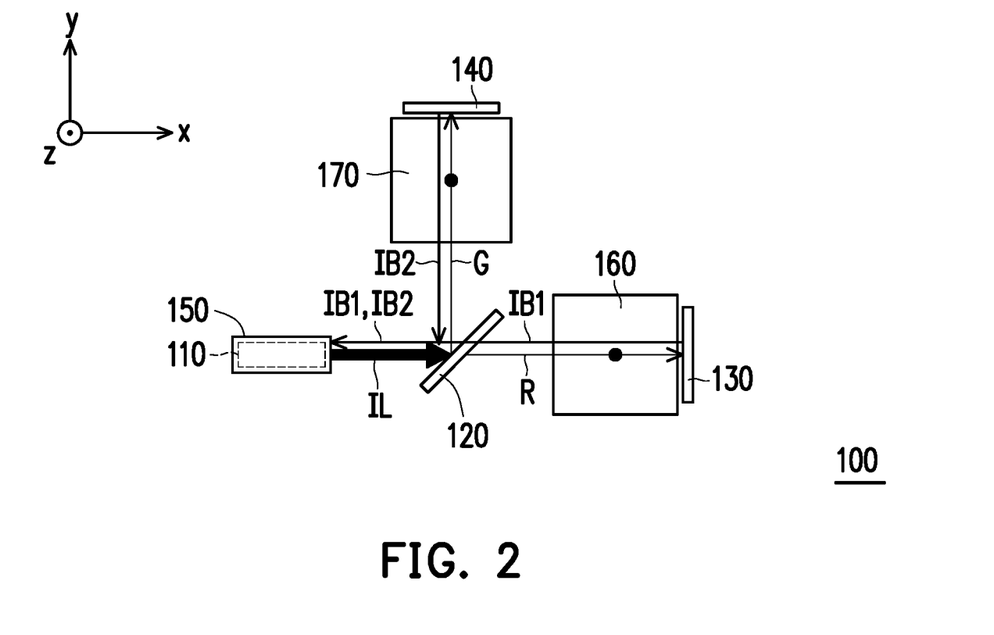
FIG. 2 is a schematic top view of a projection device according to the embodiment of FIG. 1 of the disclosure.
Figure 3:
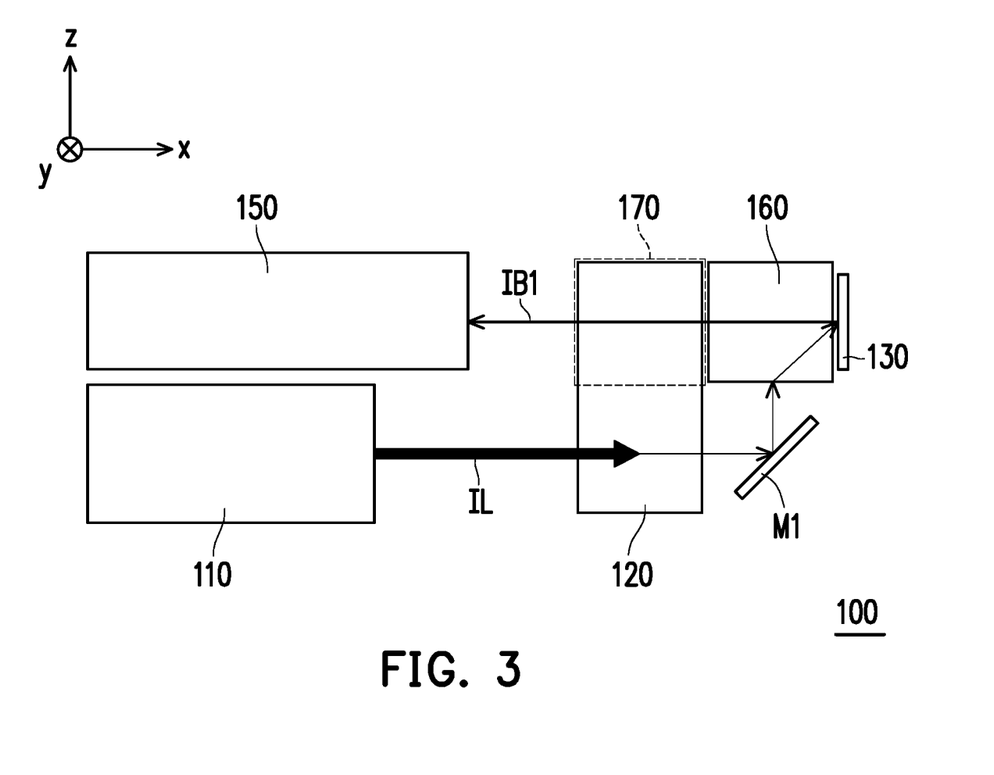
FIG. 3 is a schematic side view of the projection device according to the embodiment of FIG. 1 of the disclosure.

FIG. 1 is a schematic view of a projection device from a perspective according to an embodiment of the disclosure. FIG. 2 is a schematic top view of a projection device according to the embodiment of FIG. 1 of the disclosure. FIG. 3 is a schematic side view of the projection device according to the embodiment of FIG. 1 of the disclosure. Referring to FIG. 1-FIG. 3, a projection device 100 includes an illumination system 110, a light splitting and combining element 120, at least two reflecting elements such as a reflecting element M1 and a reflecting element M2, at least two light valves such as a light valve 130 and a light valve 140 and an image-forming lens 150.

The illumination system 110 is configured to provide an illumination beam IL, wherein the illumination beam IL includes a first color light R and a second color light G The light splitting and combining element 120 is disposed on a transmission path of the illumination beam IL. After the illumination beam IL is transmitted to the light splitting and combining element 120, the light splitting and combining element 120 splits the illumination beam IL into the first color light R and the second color light G, that is, the light splitting and combining element 120 allows the first color light R to pass through and reflects the second color light G In the embodiment, the illumination beam IL may be a yellow beam, the first color light R may be a red beam, and the second color light G may be a green beam; that is, the yellow beam at least includes beams having red wavelength band and green wavelength band, which should not be construed as a limitation to the disclosure. The reflecting element M1 and the reflecting element M2 are configured to reflect an incident beam, and respectively disposed on transmission paths of the first color light R and the second color light G from the light splitting and combining element 120 so as to change the transmission directions of the first color light R and the second color light G.

The light valve 130 is disposed on a transmission path of the first color light R reflected by the reflecting element M1, and converts the reflected first color light R into a first color image light IB1. The light valve 140 is disposed on a transmission path of the second color light G reflected by the reflecting element M2, and converts the reflected second color light G into a second color image light IB2.

Additionally, the projection device 100 of the embodiment further includes a first prism set 160 and a second prism set 170. The first prism set 160 and the second prism set 170 having one or more prisms are configured to control the transmission path of the beam or split the beam. The first prism set 160 is disposed on a transmission path of the first color light R between the reflecting element M1 and the light valve 130. The second prism set 170 is disposed on a transmission path of the second color light G between the reflecting element M2 and the light valve 140. The first color light R enters the first prism set 160 through a surface S1 (i.e., first surface) after being reflected by the reflecting element M1, leaves the first prism set 160 through a surface S2 (i.e., second surface) and is transmitted to the light valve 130 to be converted by the light valve 130 into the first color image light IB1. Then the first color image light IB1 enters the first prism set 160 through the surface S2, and is transmitted to the light splitting and combining element 120 after leaving the first prism set 160 through a surface S3 (i.e., third surface). The second color light G enters the second prism set 170 through a surface S4 (i.e., fourth surface) after being reflected by the reflecting element M2, and is transmitted to the light valve 140 after leaving the second prism set 170 through a surface S5 (i.e., fifth surface) to be converted by the light valve 140 into the second color image light IB2. Then the second color image light IB2 enters the second prism set 170 through the surface S5 and leaves the second prism set 170 through a surface S6 (i.e., sixth surface) to be transmitted to the light splitting and combining element 120.

The image-forming lens 150 is disposed on a transmission path of the first color image light IB1 from the light valve 130 and the second color image light IB2 from the light valve 140. The first color image light IB1 converted from the first color light R passes through the light splitting and combining element 120 again and is transmitted to the image-forming lens 150, and the second color image light IB2 converted from the second color light G is reflected by the light splitting and combining element 120 again and is transmitted to the image-forming lens 150. The image-forming lens 150 receives the first color image light IB1 and the second color image light IB2 and projects a projection beam PB to display a projection image.

In the embodiment, the illumination system 110 and the image-forming lens 150 are disposed on the same side of the light splitting and combining element 120, and the transmission direction of the first color image light IB1 and the second color image light IB2 between the light splitting and combining element 120 and the image-forming lens 150 is parallel with and opposite to the transmission direction of the illumination beam IL between the illumination system 110 and the light splitting and combining element 120.

The above-mentioned elements and the configuration relationship between the elements will be described in details below.

For example, the illumination system 110 may include at least one light emitting element for emitting light, a light diffusing element or a wavelength converting device. The at least one light emitting element is, for example, a diode module including a light emitting diode or a laser diode (LD) chip or an array consisting of a plurality of diode modules for providing a beam of single color such as blue laser beam, red laser beam, which should not be construed as limitation to the disclosure. Green beam represents that the peak wavelength thereof falls within a wavelength range of 500 nm to 565 nm. Red beam represents that the peak wavelength thereof falls within a wavelength range of 625 nm to 740 nm. Blue beam represents that the peak wavelength thereof falls within a wavelength range of 400 nm to 470 nm. The peak wavelength is defined as a wavelength corresponding to the maximum light intensity.

The wavelength converting device is an optical element configured to convert a short-wavelength beam into a long-wavelength converting beam relative to the short-wavelength beam. For example, the wavelength converting device may be a phosphor wheel. The phosphor wheel is provided with a photoluminescence material (e.g., phosphor powder) which can receive short-wavelength beam and generate a corresponding converting beam via a photoluminescence phenomenon. The disclosure is not limited herein. In an embodiment, when the photoluminescence material is phosphor powder that can excite yellow beam and the blue beam with shorter wavelength provided by the light emitting element is irradiated on the phosphor powder that can excite yellow beam, the phosphor powder may be excited by the blue beam and convert at least a portion of the blue beam into yellow beam, wherein the yellow beam has yellow light spectrum with peak wavelength in a range of 535 nm to 570 nm. When the photoluminescence material is a phosphor powder that can excite green beam, the converting beam is correspondingly a green beam. When the phosphor wheel has slot, the blue beam passes through the phosphor wheel. The light diffusing element, such as a diffusor wheel, a vibrating diffusor, a diffusion plate or a diffusor of other elements, is an optical element that causes the beam passing through the light diffusing element to diffuse/scatter, which should not be construed as a limitation to the disclosure.

Sufficient teaching, suggestions and implementation of the details step and specific realization of the illumination system 110 may be derived from the above descriptions as well as ordinary knowledge of the field, and thus no repetition is incorporated herein.

The light splitting and combining element 120 is an optical element capable of splitting and combining light. In the embodiment, the light splitting and combining element 120 is a dichroic mirror (DM) of which the surface has a dichroic coating with wavelength selectivity, which is an color-separation film for color separation or combination depending on wavelengths (colors), but not limited thereto. In the embodiment, the light splitting and combining element 120 is designed to allow the first color light R belonging to the red beam to pass through, and reflect the second color light G belonging to the green beam. The first color image light IB1 (i.e., red image light) converted from the first color light R passes through the light splitting and combining element 120 again, and the second color image light IB2 (i.e., green image light) converted from the second color light G is reflected by the light splitting and combining element 120 again, such that the first color image light IB1 and the second color image light IB2 are combined by the light splitting and combining element 120 and transmitted to the image-forming lens 150. However, in another embodiment, the light splitting and combining element 120 is designed to be able to reflect the red beam and allow the green beam to pass through, which should not be construed as a limitation to the disclosure.

The light valve 130 or the light valve 140 refers to any one of spatial light modulators such as a digital micro-mirror device (DMD), a liquid-crystal-on-silicon panel (LCOS panel) or a liquid crystal display panel (LCD). In the embodiment, the number of light valve is, for example, two (light valve 130 and light valve 140), and each of the two light valve is a digital micro-mirror device. Specifically, the light valve 130 receives the first color light R and converts the first color light R into the first color image light IB1. The light valve 140 receives the second color light G and converts the second color light G into the second color image light IB2. In the embodiment, sufficient teaching, suggestions and implementation of detailed steps and method of converting the single color light received by the light valve 130 and the light valve 140 into image beam may be derived from common knowledge of the field and thus no repetition is incorporated herein.

The image-forming lens 150, for example, includes a combination of one or more optical lens having refractive powers, such as various combinations among non-planar lenses including a biconcave lens, a biconvex lens, a concave-convex lens, a convex-concave lens, a plano-convex lens and a plano-concave lens. In an embodiment, the image-forming lens 150 may include a planar optical lens. The disclosure provides no limitation to the form and type of the image-forming lens 150. The image-forming lens 150 is disposed on a transmission path of the first color image light IB1 and the second color image light IB2. In the embodiment, the image-forming lens 150 receives the first color image light IB1 and the second color image light IB2 to generate the projection beam PB, and projects the projection beam PB onto a projection medium. The projection medium is, for example, a projection screen, a projection wall or an electronic whiteboard and so on, which should not be construed as a limitation to the disclosure.

Figure 4:
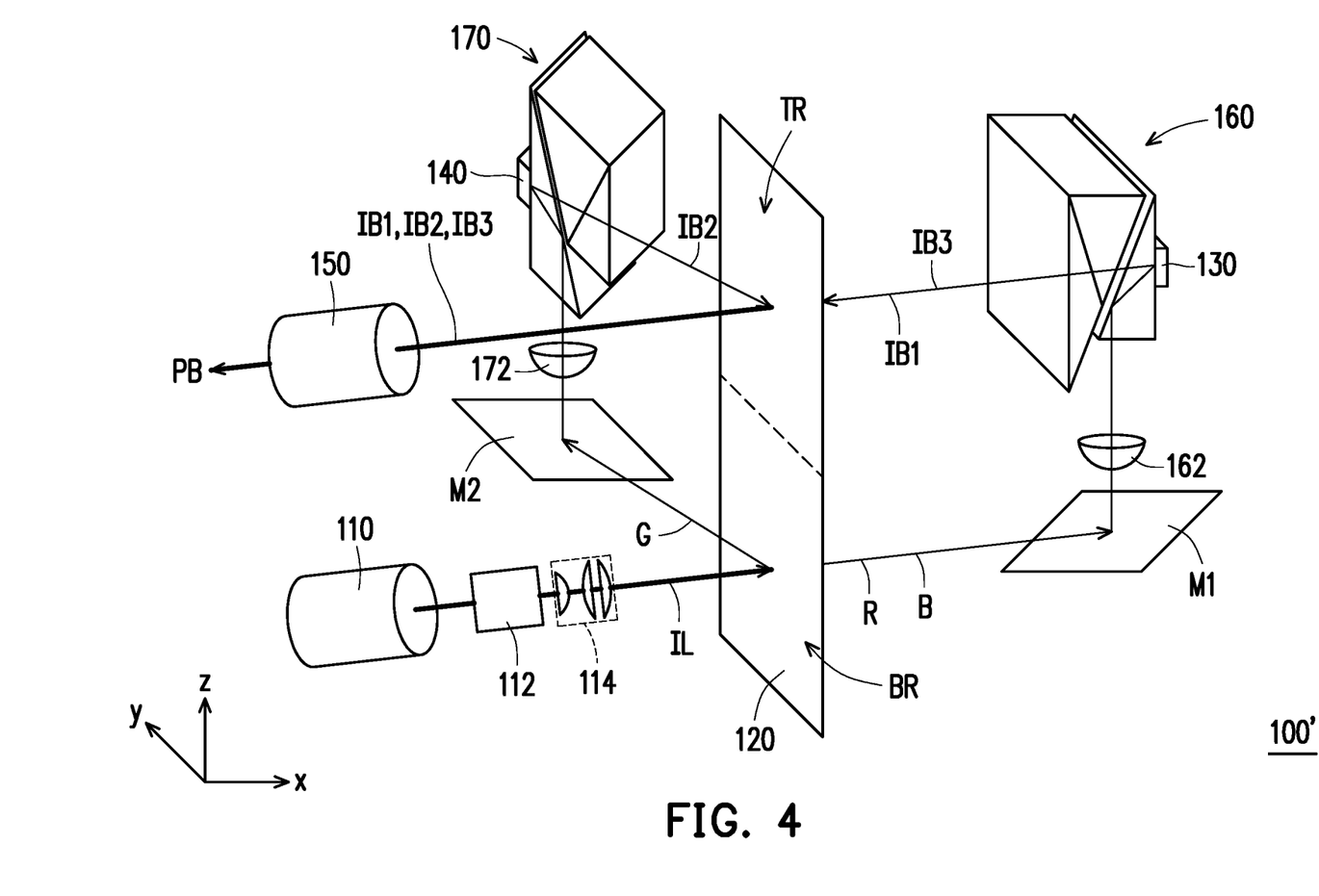
FIG. 4 is a schematic view of a projection device from a perspective according to an embodiment of the disclosure.

FIG. 4 is a schematic view of a projection device from a perspective according to an embodiment of the disclosure. Referring to FIG. 4, a projection device 100' in the embodiment may be adaptable for the projection device 100.

In the embodiment, the projection device 100' further includes a light integration rod 112 and a first optical lens set 114. The light integration rod 112 and the first optical lens set 114 are disposed on the transmission path of the illumination beam IL in sequence. The light integration rod 112 is configured to uniform the light and allow the beam that passes through to be uniformly and accurately outputted. The first optical lens set 114 has one or more optical lenses provided therein for calibrating beam. The illumination beam IL is transmitted to the light splitting and combining element 120 after passing through the light integration rod 112 and the first optical lens set 114.

Referring to the projection device 100 shown in FIG. 1 or the projection device 100' shown in FIG. 4, the light splitting and combining element 120 may be divided into two neighboring regions. Here, the light splitting and combining element 120 is divided into upper and lower parts: the illumination beam IL from the illumination system 110 enters a first region BR, and an image light (including first color image light IB1 and second color image light IB2) from the light valve 130 and the light valve 140 enters a second region TR. That is, after the illumination beam IL enters the first region BR of the light splitting and combining element 120, the optical paths of the first color light R and the second color light G are spitted. Meanwhile, after the image light from the light valve 130 and the light valve 140 enters the second region TR of the light splitting and combining element 120, the first color image light IB1 and the second color image light IB2 are combined and transmitted to the image-forming lens 150.

In other words, although the color image light IB1, IB2 and the illumination beam IL pass through the same light splitting and combining element 120, the regions which are irradiated are different. The alignment direction of the first region BR and the second region TR is as z direction shown in FIG. 1 or FIG. 4 and perpendicular to the transmission direction of the illumination beam IL between the illumination system 110 and the light splitting and combining element 120 as the positive x direction shown in FIG. 1 or FIG. 4, and is also perpendicular to the transmission direction of the first color image light IB1 and the second color image light IB2 between the light splitting and combining element 120 and the image-forming lens 150 as the negative x direction shown in FIG. 1 or FIG. 4. That is, the transmission direction (negative x direction) of the first color image light IB1 and the second color image light IB2 between the light splitting and combining element 120 and the image-forming lens 150 is parallel with and opposite to the transmission direction (positive×direction) of the illumination beam IL between the illumination system 110 and the light splitting and combining element 120.

Furthermore, referring to FIG. 4, in the embodiment, the reflecting element M1 and the reflecting element M2 respectively reflect the first color light R and the second color light G from the first region BR such that the first color light R and the second color light G respectively pass through the first prism set 160 and the second prism set 170 and are transmitted to the light valve 130 and the light valve 140. Here, the first prism set 160 and the second prism set 170 are exemplified as a prism set constructed by three splitting prisms; however, the disclosure provides no limitation to the number, the optical path and the light-splitting design of the first prism set 160 and the second prism set 170.

In the embodiment, a second optical lens set 162 is disposed on a beam transmission path between the reflecting element M1 and the first prism set 160. A third optical lens set 172 is further disposed on a beam transmission path between the reflecting element M2 and the second prism set 170, respectively configured to calibrate the reflected first color light R and the second color light G.

Likewise, the light valve 130 and the light valve 140 are respectively disposed on one side of the first prism set 160 and the second prism set 170, and the light-entering surface through which the first color light R enters the first prism set 160 is different from the light-exiting surface through which the first color image light IB1 leaves the first prism set 160. Similarly, the light-entering surface through which the second color light G enters the second prism set 170 is different from the light-exiting surface through which the second color image light IB2 leaves the second prism set 170.

The first color image color IB1 and the second color image light IB2 respectively leave the first prism set 160 and the second prism set 170 then to enter the second region TR of the light splitting and combining element 120. The first color image light IB1 passes through the second region TR of the light splitting and combining element 120 and is transmitted to the image-forming lens 150. The second color image light IB2 is reflected by the second region TR of the light splitting and combining element 120 to the image-forming lens 150.

In the embodiment, the illumination beam IL provided by the illumination system 110 of the projection device 100' includes a third color light B other than the first color light R and the second color light G Here, the blue beam is described as an example. The light splitting and combining element 120 allows the third color light B to pass through. Therefore, the transmission path of the third color light B from the light splitting and combining element 120 is the same as the transmission path of the first color light R, which should not be construed as a limitation to the disclosure. In another embodiment, the light splitting and combining element 120 reflects the third color light B, and therefore the transmission path of the third color light B from the light splitting and combining element 120 is the same as the transmission path of the second color light G Specifically, one of the light valve 130 and the light valve 140 may convert the third color light B into a third color image light IB3. In this manner, the third color image light IB3 may be transmitted to the image-forming lens 150 on one of the first color image light IB1's and the second image light IB2's optical paths.

The first color image light IB1, the second color image light IB2 and the third color image light IB3 are formed into the projection beam PB through the first prism set 160 as well as the second prism set 170 and the image-forming lens 150, thereby forming a projection image on the projection medium. The sufficient teaching, suggestions and implementation about how to form the projection image, regarding the detailed steps and method thereof, may be derived from common knowledge of the field; therefore, no repetition is incorporated herein.

Figure 5A:
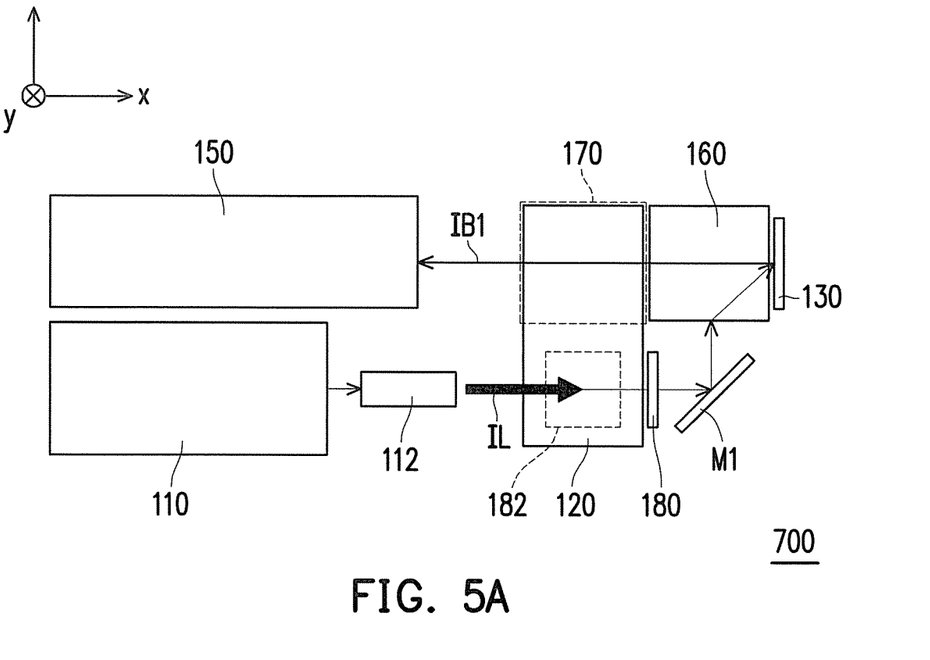
FIG. 5A is a schematic side view of a projection device according to an embodiment of the disclosure.
Figure 5B:
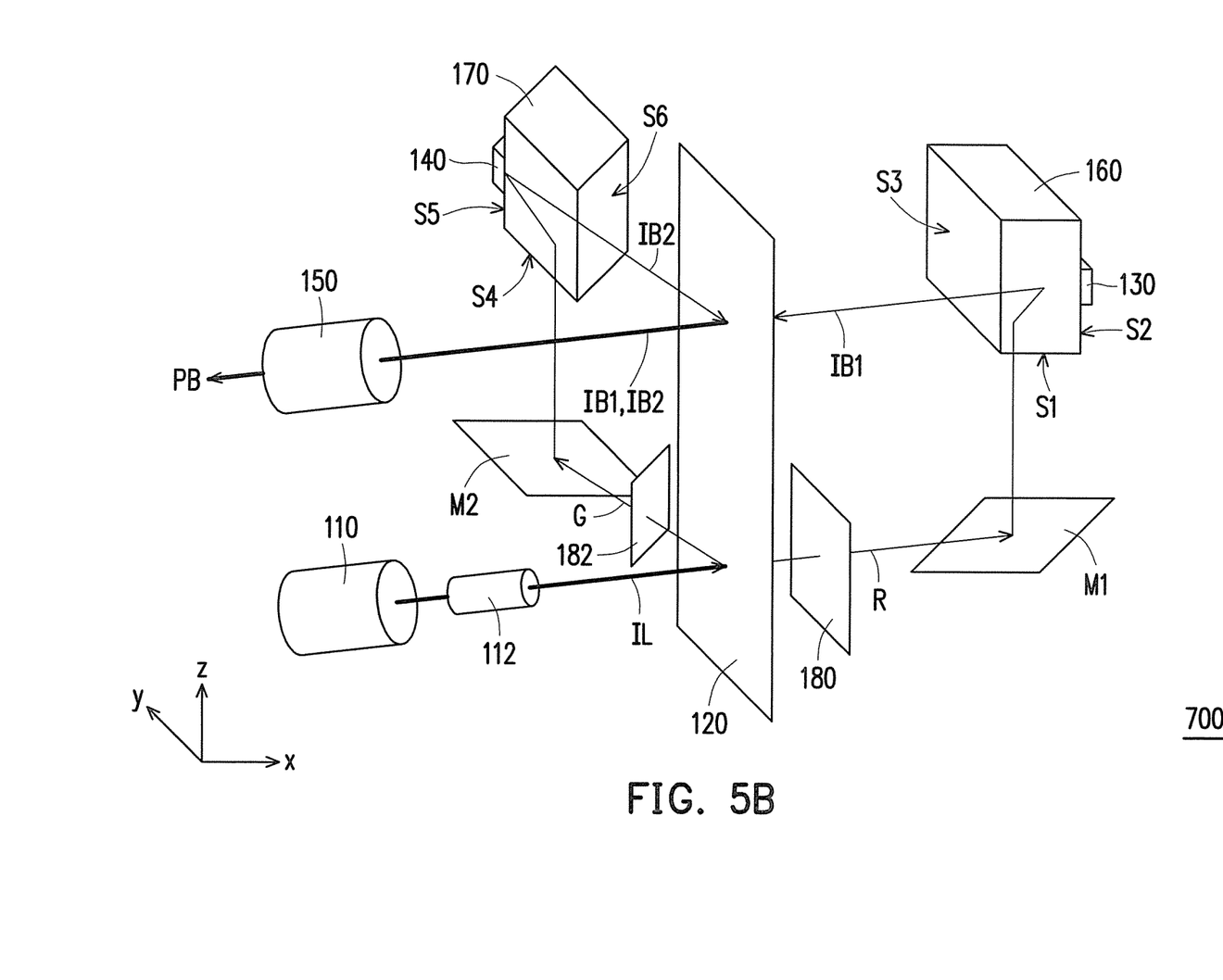
FIG. 5B is a schematic view showing another viewing angle of FIG. 5A.

FIG. 5A is a schematic side view of a projection device according to an embodiment of the disclosure and FIG. 5B is a schematic view showing another viewing angle of FIG. 5A. Referring to FIG. 5A and FIG. 5B, a projection device 700 in the embodiment may be adaptable for the projection device 100 and the projection device 100' described above.

The implementation method of the projection device 700 and the configuration relationship between the elements of the projection device 700 are similar to the projection device 100 shown in FIG. 1 and the projection device 100' shown in FIG. 4. The main difference is that the projection device 700 not only includes the light integration rod 112 but also includes at least two filters, namely filter 180 and filter 182. The filter 180 is disposed on the transmission path of the first color light R that passes through the light splitting and combining element 120, and between the light splitting and combining element 120 and the light valve 130. The filter 182 is disposed on the transmission path of the second color light G reflected by the light splitting and combining element 120 and between the light splitting and combining element 120 and the light valve 140.

Figure 6:
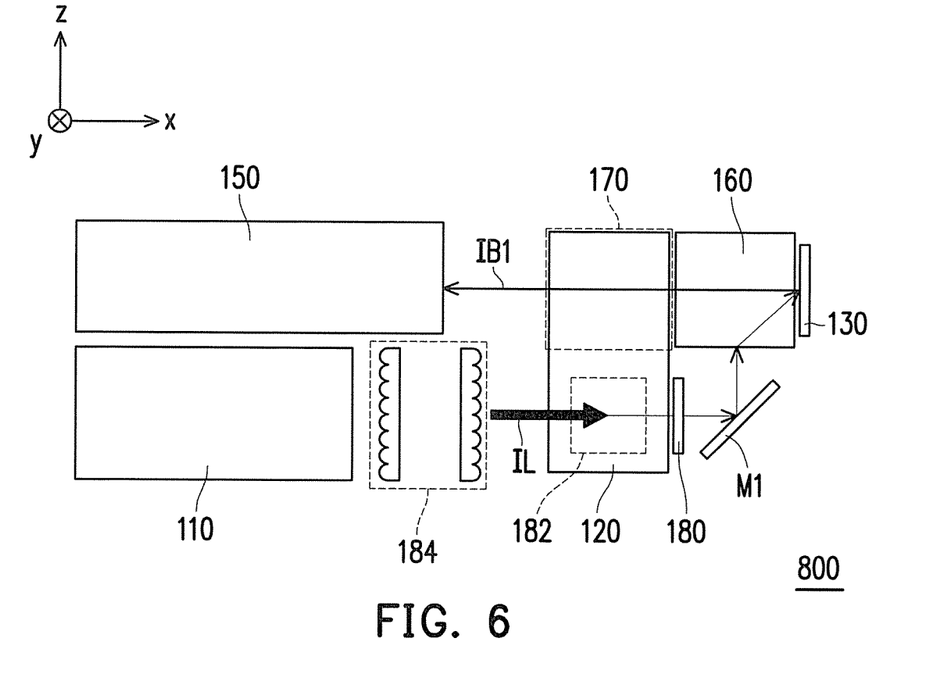
FIG. 6 is a schematic side view of a projection device according to an embodiment of the disclosure.

FIG. 6 is a schematic side view of a projection device according to an embodiment of the disclosure. Referring to FIG. 6, a projection device 800 in the embodiment may be adaptable for the projection device 100 shown in FIG. 1, the projection device 100' shown in FIG. 4 or the projection device 700 shown in FIG. 5A and FIG. 5B. The implementation method of the projection device 800 and the configuration relationship between the elements of the projection device 800 are similar to the projection device 700. The schematic diagram of FIG. 6 seen from another viewing angle may be referred to FIG. 5B. The main difference is that, as compared to the projection device 700, the projection device 800 also includes the filter 180 and the filter 182 but does not use the light integration rod 112; instead, the projection device 800 uses a lens array module 184. The lens array module 184 is disposed on the transmission path of the illumination beam IL, and the illumination beam IL is transmitted to the light splitting and combining element 120 after passing through the lens array module 184. The lens array module 184 is, for example, constructed by two sets of lens arrays facing away from each other and aligned with each other. Specifically, the convex surface of the lens array is regarded as the front surface, and the planar surface is regarded the rear surface. Here, aligned arrangement refers to that the positions of lens unit of the two sets of lens arrays are aligned with each other. The beam passing through the lens array module 184 makes the light to be distributed uniformly.

Figure 7:
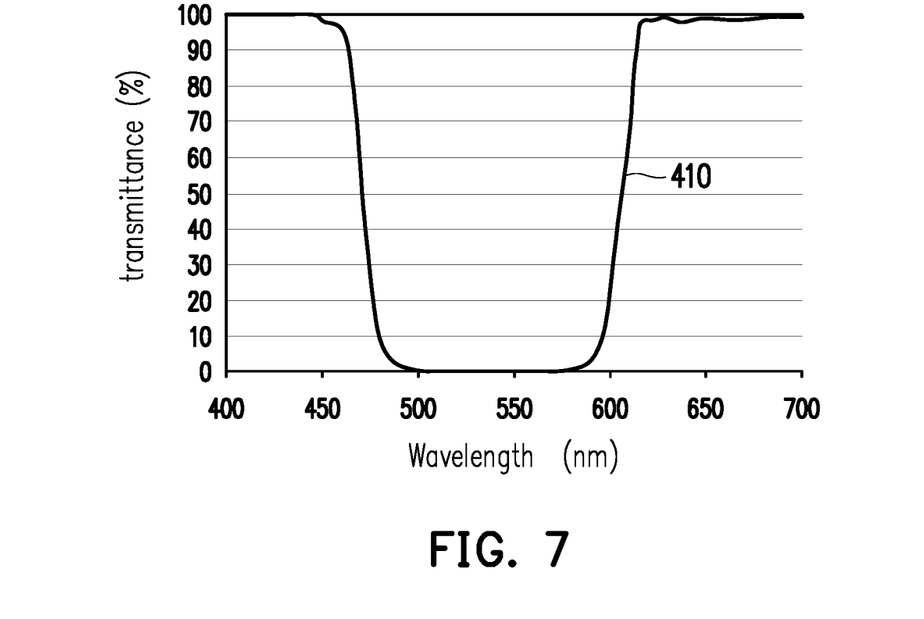
FIG. 7 is a schematic view showing transmittance variation versus wavelength of a filter for allowing the first color light to pass therethrough according to an embodiment of the disclosure.
Figure 8:
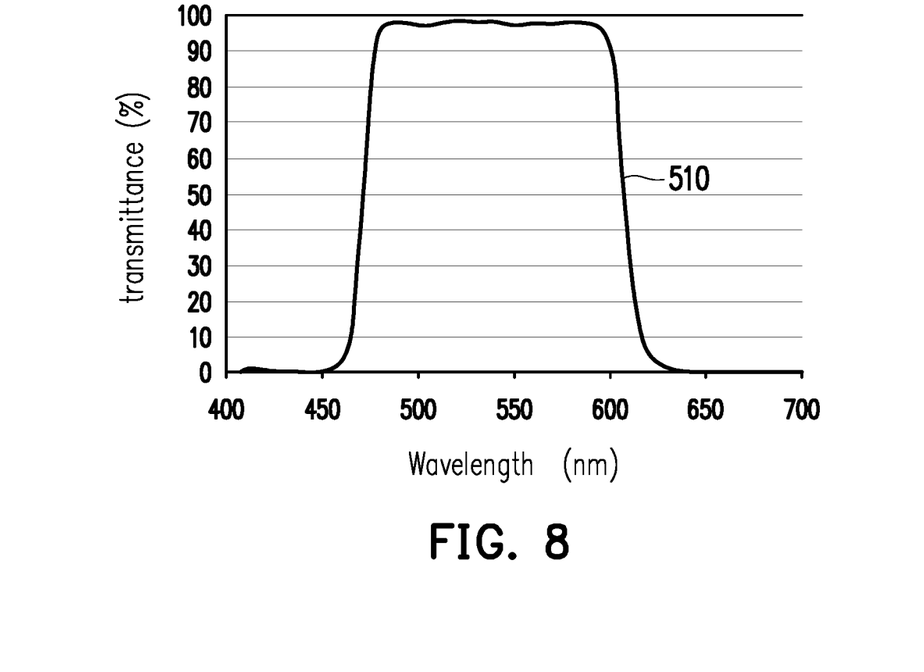
FIG. 8 is a schematic view showing transmittance variation versus wavelength of a filter for allowing the second color light to pass therethrough according to an embodiment of the disclosure.

FIG. 7 is a schematic view showing transmittance variation versus wavelength of a filter for allowing the first color light to pass therethrough according to an embodiment of the disclosure. FIG. 8 is a schematic view showing transmittance variation versus wavelength of a filter for allowing the second color light to pass therethrough according to an embodiment of the disclosure. Referring to FIG. 7 and FIG. 8, the transmittance variation with respect to wavelength of the filter 180 of the projection device 700 and the projection device 800 may be as indicated by transmittance 410 shown in FIG. 7. The first color light R is red beam. After the first color light R passes through the filter 180, other color light that is not red light may be filtered such that red color is more pure. The third color light B is blue beam. After the third color light B passes through the filter 180, other color light that is not blue color may be filtered such that blue color is more pure. For example, the filter 180 has 100% transmittance with respect to the blue beam (third color light B) having wavelength less than 470 nm and the red beam (first color light R) having wavelength greater than 620 nm. The transmittance variation with respect to wavelength of the filter 182 may be as indicated by transmittance 510 shown in FIG. 8. The second color light G is green beam. After the second color light G passes through the filter 182, other color light that is not green light may be filtered such that green color is more pure. For example, the filter 182 has 100% transmittance with respect to the green beam (second color light G) having wavelength in a range between 500 nm and 565 nm. It should be indicated that the disclosure provides no limitation to the configuration position of the filter 180 and the filter 182. The embodiments shown in FIG. 5A, FIG. 5B and FIG. 6 only serve as examples. In other embodiments, the filter may be disposed at any position on the transmission path of the single color beam (first color light R or second color light G). Also, the disclosure provides no limitation to the range of the color light wavelength band that can be filtered by the filter 180 and the filter 182, which allow the color light with narrower wavelength band to pass through such that the color light is more pure.

Sufficient teaching, suggestions and implementation regarding the specific implementation method of the projection device 700 and the projection device 800 may be derived from the embodiments provided above, and thus no repetition is incorporated herein.

In summary, the exemplary embodiments of the disclosure provide a projection device, including the illumination system, the light splitting and combining element, at least two reflecting elements, at least two light valves and the image-forming lens. The illumination system provides the illumination beam. The light splitting and combining element is disposed on the transmission path of the illumination beam for splitting the illumination beam into the first color light and the second color light, and allows the first color light to pass through and reflects the second color light. The at least two reflecting elements respectively reflect the first color light and the second color light. The at least two light valves respectively convert the reflected first color light and the second color light into the first color image light and the second color image light, and the first color image light and the second color image light are transmitted to the light splitting and combining element. Specifically, the first color image light passes through the light splitting and combining element to the image-forming lens, and the second color image light is reflected by the light splitting and combining element to the image-forming lens. The image-forming lens receives the first color image light and the second color image light to generate the projection beam. In this manner, the number of the light splitting and combining element required by the projection device of the embodiment is reduced, such that it is possible to use the structure with only a single light splitting and combining element, and it is not necessary to use a plurality kinds of coatings; accordingly, optical efficiency may be enhanced. Additionally, the illumination system and the image-forming lens of the projection device in the embodiment may be disposed on the same side, thereby reducing the volume of the projection device and improving compactness of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the present disclosure is intended to be dedicated to the public regardless of whether the element or component is explicitly recited in the following claims.

What is claimed is:

1. A projection device, comprising: an illumination system, a light splitting and combining element, at least two light valves and an image-forming lens, wherein the illumination system is configured to provide an illumination beam, the illumination beam comprising a first color light and a second color light;

the light splitting and combining element is disposed on a transmission path of the illumination beam, and configured to allow the first color light to pass through and reflect the second color light;

the at least two light valves are respectively disposed on transmission paths of the first color light and the second color light from the light splitting and combining element, and configured to convert the first color light and the second color light into a first color image light and a second color image light respectively; and the image-forming lens is disposed on a transmission path of the first color image light and the second color image light from the at least two light valves, and configured to receive the first color image light and the second color image light to generate a projection beam, wherein the first color image light from the first color light passes through the light splitting and combining element to the image-forming lens, and the second color image light from the second color light is reflected by the light splitting and combining element to the image-forming lens, wherein the light splitting and combining element comprises a first region and a second region adjacent to each other, the illumination beam from the illumination system enters the first region of the light splitting and combining element, the first color image light and the second color image light from the at least two light valves enter the second region of the light splitting and combining element.

2. The projection device according to claim 1, wherein the projection device further comprises at least two reflecting elements respectively disposed on the transmission paths of the first color light and the second color light from the light splitting and combining element, and configured to respectively reflect the first color light and the second color light to the at least two light valves.

3. The projection device according to claim 1, wherein a transmission direction of the first color image light and the second color image light between the light splitting and combining element and the image-forming lens is parallel with and opposite to a transmission direction of the illumination beam between the illumination system and the light splitting and combining element.

4. The projection device according to claim 3, wherein the illumination system and the image-forming lens are disposed on the same side of the light splitting and combining element.

5. The projection device according to claim 1, wherein an alignment direction of the first region and the second region is perpendicular to a transmission direction of the illumination beam between the illumination system and the light splitting and combining element, and the alignment direction of the first region and the second region is perpendicular to a transmission direction of the first color image light and the second color image light between the light splitting and combining element and the image-forming lens.

6. The projection device according to claim 1, wherein the projection device further comprises at least two reflecting elements respectively disposed on the transmission paths of the first color light and the second color light from the light splitting and combining element, and the at least two reflecting elements respectively reflect the first color light and the second color light from the first region to the at least two light valves.

7. The projection device according to claim 6, further comprising:

a first prism set, disposed on the transmission path of the first color light and having a first surface, a second surface and a third surface, wherein the first color light reflected by one of the at least two reflecting elements enters the first prism set through the first surface, and is transmitted to one of the at least two light valves after leaving through the second surface, wherein the first color image light enters the first prism set through the second surface, and is transmitted to the second region of the light splitting and combining element after leaving through the third surface; and a second prism set, disposed on the transmission path of the second color light and having a fourth surface, a fifth surface and a sixth surface, wherein the second color light reflected by the other one of the at least two reflecting elements enters the second prism set through the fourth surface, and is transmitted to the other one of the at least two light valves after leaving through the fifth surface, wherein the second color image light enters the second prism set through the fifth surface, and is transmitted to the second region of the light splitting and combining element after leaving through the sixth surface.

8. The projection device according to claim 1, wherein the illumination beam further comprises a third color light.

9. The projection device according to claim 8, wherein the light splitting and combining element allows the third color light to pass through, a transmission path of the third color light from the light splitting and combining element is the same as that of the first color light.

10. The projection device according to claim 8, wherein the light splitting and combining element reflects the third color light, and a transmission path of the third color light from the light splitting and combining element is the same as that of the second color light.

11. The projection device according to claim 1, wherein the illumination system comprises:

a light integration rod, disposed on the transmission path of the illumination beam, and the illumination beam being transmitted to the light splitting and combining element after passing through the light integration rod.

12. The projection device according to claim 1, further comprising:

two filters, wherein one of the two filters is disposed on a transmission path of the first color light, and is located between the light splitting and combining element and one of the at least two light valves, and the other of the two filters is disposed on a transmission path of the second color light and is located between the light splitting and combining element and the other of the at least two light valves.

13. The projection device according to claim 1, wherein the illumination system comprises:

a lens array module, disposed on the transmission path of the illumination beam, and the illumination beam being transmitted to the light splitting and combining element after passing through the lens array module.

* * * * *